(12) United States Patent
Takai

(10) Patent No.: US 10,196,313 B2
(45) Date of Patent: Feb. 5, 2019

(54) ZIRCONIA FINE POWDER AND PRODUCTION METHOD THEREFOR

(71) Applicant: DAIICHI KIGENSO KAGAKU KOGYO CO., LTD., Osaka-shi, Osaka (JP)

(72) Inventor: Masayuki Takai, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days.

(21) Appl. No.: 15/764,055

(22) PCT Filed: Mar. 28, 2017

(86) PCT No.: PCT/JP2017/012670
§ 371 (c)(1),
(2) Date: Mar. 28, 2018

(87) PCT Pub. No.: WO2017/170565
PCT Pub. Date: Oct. 5, 2017

(65) Prior Publication Data
US 2018/0282225 A1     Oct. 4, 2018

(30) Foreign Application Priority Data
Mar. 30, 2016   (JP) ................................. 2016-069462

(51) Int. Cl.
C04B 35/486     (2006.01)
C04B 35/488     (2006.01)
C04B 35/626     (2006.01)

(52) U.S. Cl.
CPC .... *C04B 35/4885* (2013.01); *C04B 35/62645* (2013.01); *C04B 2235/3217* (2013.01); *C04B 2235/3246* (2013.01); *C04B 2235/656* (2013.01); *C04B 2235/77* (2013.01)

(58) Field of Classification Search
CPC .. C04B 35/486; C04B 35/488; C04B 35/4885
See application file for complete search history.

(56) References Cited

U.S. PATENT DOCUMENTS

| | | | | |
|---|---|---|---|---|
| 7,632,769 | B2 * | 12/2009 | Okamoto | B01D 53/885 423/608 |
| 7,642,210 | B2 * | 1/2010 | Okamoto | B01D 53/885 423/608 |
| 9,120,200 | B2 * | 9/2015 | Haerle | B24B 37/044 |
| 9,309,157 | B2 * | 4/2016 | Fujisaki | C04B 35/486 |
| 2006/0018822 | A1 | 1/2006 | Okamoto | |
| 2008/0312075 | A1 | 12/2008 | Okamoto | |
| 2009/0149320 | A2 | 6/2009 | Okamoto | |

FOREIGN PATENT DOCUMENTS

| | | |
|---|---|---|
| JP | 5-193947 A | 8/1993 |
| JP | 5-193948 A | 8/1993 |
| JP | 2003-206137 A | 7/2003 |
| JP | 2004-203697 A | 7/2004 |
| JP | 2006-36576 A | 2/2006 |
| JP | 2008-24555 A | 2/2008 |
| JP | 2008-81392 A | 4/2008 |
| JP | 2013-42047 A | 2/2013 |
| JP | 2014-504324 A | 2/2014 |
| JP | 2014-129234 A | 7/2014 |
| JP | 2014-141383 A | 8/2014 |
| JP | 2014-185078 A | 10/2014 |
| WO | 2012/092361 A2 | 7/2012 |

OTHER PUBLICATIONS

International Search Report dated May 16, 2017, issued in counterpart application No. PCT/JP2017/012670. (2 pages).
Decision to Grant a Patent dated Oct. 31, 2017, Issued in counterpart Japanese Patent Application No. 2017-535479, w/English translation (6 pages).
Notification of Reasons for Refusal dated Aug. 15, 2017, issued in counterpart Japanese Patent Application No. 2017-535479, w/English translation (6 pages).
Buchanan, R.C. et al., "Densification of Submicron YSZ Powders with Alumina and Borate Additives", Final Report. Technical Report No. 9 Contract No. US Navy N-00014-80-K-0969, vol. 85, No. 8; cited in Extended (supplementary) European Search Report dated Jul. 4, 2018. (39 pages).
Ani, S. M. et al., "Effects of Injection Temperature and Pressure on Green Part Density for Ceramic Injection Molding", Advanced Materials Research, Dec. 27, 2012, vol. 622-623, pp. 429-432; cited in Extended (supplementary) European Search Report dated Jul. 4, 2018.
Yu, P.C. et al, "Sintering of Nano-sized Zirconia Powder Processed by Powder Injection Moulding", Emerging Technologies—Nanoelectronics, 2006 IEEE Conference on Singaparore Jan. 10-13, 2006, pp. 113-115; cited in Extended (supplementary) European Search Report dated Jul. 4, 2018.

(Continued)

*Primary Examiner* — Karl E Group
(74) *Attorney, Agent, or Firm* — Westerman, Hattori, Daniels & Adrian, LLP

(57) ABSTRACT

Provided is a zirconia powder that has excellent moldability and a high sintered density, and that can produce a zirconia sintered product in a simple manner; also provided is a method for producing the zirconia powder. The zirconia powder according to the present invention comprises 2 to 6 mol % of yttria, has a volume of pores with a pore diameter of 200 nm or less of 0.14 to 0.28 mL/g, and has a relative molding density of 44 to 55% when the zirconia powder is molded at a molding pressure of 1 t/cm$^2$, wherein the relative molding density is represented by the following formula (1):

relative molding density (%)=(molding density/theoretical sintered density)×100     (1).

15 Claims, No Drawings

(56) References Cited

OTHER PUBLICATIONS

Extended (supplementary) European Search Report dated Jul. 4, 2018, issued in counterpart European Application No. 17775102.1. (6 pages).

Shikata, R. et al., "Improvement of Heat Degradation in Y-TZP by Surface Modification", Material, Jul. 1991, vol. 40, No. 454, pp. 927-933; cited in Notice of Oppostion received on Jul. 12, 2018 for the corresponding JP Patent No. 6250242; with English Abstract.

Kihara, M. et al., "Effects of Al2O3 Addition on Mechanical Properties and Microstructures of Y-TZP", Journal of the Ceramic Society of Japan, 1998, vol. 96, No. 6, pp. 646-653; cited in the Notice of Opposition received on Jul. 12, 2018 for the corresponding JP Patent No. 6250242; with English Abstract.

* cited by examiner

ZIRCONIA FINE POWDER AND PRODUCTION METHOD THEREFOR

TECHNICAL FIELD

The present invention relates to a zirconia fine powder and a method for producing the same.

BACKGROUND ART

Zirconia (zirconium oxide) is used for a very wide range of applications. Typical examples of zirconia include powders produced by drying methods, powders produced by wetting methods, etc. Recently, research and development has been actively conducted on wet zirconia powders because of their multifunctionality. For example, wet zirconia produced by a wet purification method, such as hydrolysis, is used for electronic materials, co-catalysts for purifying automobile exhaust gas, oxygen sensors, fine ceramics, antireflection films, electrolytes of solid oxide fuel cells, and the like.

Wet zirconia is sometimes used as a powder base, but is often used as a sintered product to exhibit its functions. A zirconia sintered product is produced by molding a zirconia crystal fine powder, and then sintering the resulting molded product. In this case, the zirconia crystal fine powder is subjected beforehand to stabilizing treatment so as to maintain a tetragonal or cubic crystal structure, which is a high-temperature stable phase of zirconia crystal, to ordinary temperature. The stabilizing treatment of zirconia crystal is generally performed by dissolving oxides, such as calcia, magnesia, and yttria, in zirconia. Sintered products comprising zirconia having only a cubic crystal structure are widely used as so-called fully stabilized zirconia (generally referred to as "stabilized zirconia") sintered products. Moreover, sintered products containing zirconia having a tetragonal crystal structure are widely used as partially stabilised zirconia sintered products.

When the above zirconia sintered product is obtained, the characteristics of the powder affect the handling and sinterability during production. Therefore, the characteristics of a zirconia sintered product to be obtained are greatly influenced by the characteristics of a zirconia powder used as a raw material. As a zirconia powder, for example, PTL 1 discloses a zirconia fine powder wherein the BET specific surface area is 6 to 28 $m^2/g$, and the ratio of [average particle diameter measured by electron microscope]/[average particle diameter determined from BET specific surface area] is 0.9 to 2.1. This zirconia fine powder can be produced by controlling the average particle diameter of hydrated zirconia, which is a raw material, and the calcination temperature thereof. The moldability and sinterability when the powder is molded and sintered to form a ceramic are enhanced. Further, PTL 2 discloses a zirconia powder comprising secondary aggregate particles, wherein the BET specific surface area is 3.5 to 20 $m^2/g$, the particle size median is 0.3 to 1 µm, and the ratio of [average particle diameter measured by electron microscope]/[average particle diameter determined from BET specific surface area] is 1 to 3. PTL 2 also discloses a zirconia powder and a method for producing the same, wherein the average particle diameter φ (µm) of hydrated zirconia sol is 0.2 µm or less, and this sol is calcined at a temperature T (° C.) that satisfies T≥3000φ+650 in the range of 800 to 1200° C. or 800 to 1300° C. to obtain a zirconia powder having a BET specific surface area S ($m^2/g$) that satisfies the relationship φ≤1/S.

PTL 3 discloses a light-transmitting zirconia sintered product comprising zirconia containing 2 to 4 mol % of yttria as a stabilizer and less than 0.1 wt % of alumina as an additive, and having a relative density of 99.8% or more and a total light transmittance as measured at a thickness of 1.0 mm of 35% or more. PTL 3 further discloses a zirconia powder obtained by sintering a powder containing less than 0.1 wt % of alumina, and having a BET specific surface area of 10 to 15 $m^2/gm$ and an average particle diameter of 0.4 to 0.7 µm at atmospheric pressure in air, wherein the sintering shrinkage rate ($\Delta\rho/\Delta T$:g/$cm^3 \cdot$° C.) during sintering at atmospheric pressure (in air, temperature rising rate: 300° C./h) is 0.0125 or more and 0.0160 or less. This powder is produced using hydrated zirconia sol as a starting material, and has a molding density of 50%.

PTL 4 discloses a zirconia-based porous body and a method for producing the same. Specifically, the zirconia-based porous body is produced by preparing a basic zirconium sulfate-containing reaction solution A by mixing a sulfidizing agent at 80° C. or more and less than 95° C. and a zirconium salt solution at 80° C. or more and less than 95° C., preparing a basic zirconium sulfate-containing reaction solution B by mixing a sulfidizing agent at 65° C. or more and less than 80° C. and a zirconium salt solution at 65° C. or more and less than 80° C., mixing the reaction solutions A and B, and aging the resulting mixture, followed by neutralization and firing.

PTL 5 discloses a porous zirconia-based powder and a method for producing the same. Specifically, when a sulfidizing agent is added to a zirconium salt solution, the sulfidizing agent is added to the zirconium salt solution at a temperature of 100° C. or more in an autoclave to thereby produce the porous zirconia-based powder.

The porous zirconia-based powders disclosed in PTL 4 and PTL 5 can be applied to catalyst carriers for purifying automobile exhaust gas, and can maintain a high pore volume even after high-temperature endurance.

CITATION LIST

Patent Literature

PTL 1: JPH05-193947A
PTL 2: JPH05-193948A
PTL 3: JP2014-135078A
PTL 4: JP2006-36576A
PTL 5: JP2008-81392A

SUMMARY OF INVENTION

Technical Problem

There are various invention disclosures and research reports on various zirconia powders, as described above; however, no detailed examination has been made on the moldability when zirconia sintered products are obtained. Making long-time hydrolysis etc. unnecessary, and reducing production costs and production time, has been strongly desired. There has also been a demand for zirconia powders having excellent moldability and enabling easy production of zirconia sintered products having a high sintered density.

Before obtaining a sintered product, it is generally necessary to pressurize a powder by press molding etc. to produce a green compact, i.e., a molded product, and to sinter the molded product; however, the characteristics of the powder have a large impact in this molding step. In order to obtain a sintered product having a high sintered density and sintered product strength, it is necessary to reduce defects and density unevenness in the molded product, and to increase the density of the molded product. In the process of press molding, it is important to reduce the friction with the metal mold wall surface during molding, and to reduce the friction between the powder particles. When the friction is high, defects, such as lamination and cracks, occur in the molded product. Moreover, when the friction is high, the molding pressure is less likely to be transmitted between the particles, and a molded product having a high molding density cannot be obtained; thus, air pores remain in the sintered product, and it is difficult to increase the sintered density. Furthermore, when injection molding, extrusion molding, cast molding, or the like was used, cracks etc. occurred in the sintered product due to the strain and uneven molding density of the molded product. When sheet molding was used, the molding density could not be increased, the sheet strength was reduced, and the processability was often degraded.

The present invention was made in consideration of the above problems. An object of the present invention is to provide a zirconia powder that has excellent moldability and a high sintered density, and that can produce a zirconia sintered product in a simple manner; and to also provide a method for producing the zirconia powder.

Solution to Problem

The present inventor conducted extensive research to achieve the above object. As a result, the present inventor focused, on the degree of aggregation of primary particles, which had not attracted attention before, and found that the above object can be achieved by a zirconia powder in which the degree of aggregation of primary particles is controlled within a specific range. Thus, the present invention has been completed. More specifically, the present inventor found that the above object can be achieved by a zirconia powder in which the amount of gaps between primary particles, i.e., pore volume, is controlled within a specific range, while enhancing the aggregation of the primary particles more than before. Thus, the present invention has been completed.

That is, the present invention includes, for example, the main subjects described in the following items.

Item 1. A zirconia powder comprising 2 to 6 mol % of yttria, having a volume of pores with a pore diameter of 200 nm or less of 0.14 to 0.28 mL/g, and having a relative molding density of 44 to 55% when the zirconia powder is molded at a molding pressure of 1 t/cm$^2$, wherein the relative molding density is represented by the following formula (1):

$$\text{relative molding density (\%)} = (\text{molding density/theoretical sintered density}) \times 100 \qquad (1).$$

Item 2. The zirconia powder according to Item 1, wherein the zirconia powder has a specific surface area of 5 to 20 m$^2$/g, and an average particle diameter of 0.3 to 0.8 μm.

Item 3. The zirconia powder according to Item 1 or 2, further comprising aluminium oxide.

Item 4. The zirconia powder according to any one of Items 1 to 3, wherein the sintered density when sintering is performed at 1450° C. is 99.5% or more of the theoretical sintered density.

Item 5. A method for producing a zirconia powder according to any one of Items 1 to 4, the method comprising:

a first step of warming a sulfidizing agent solution at a temperature of 75° C. or more and less than 100° C., and maintaining the sulfidizing agent solution at this temperature;

a second step of warming a zirconium salt solution at a temperature of 75° C. or more and less than 100° C., and maintaining the zirconium salt solution at this temperature;

a third step of mixing the sulfidizing agent solution maintained in the first step and the zirconium salt solution maintained in the second step to thereby prepare a reactant; and a fourth step of treating the reactant prepared in the third step with a base, followed by heating in an atmosphere at a temperature of 1000° C. or more and less than 1200° C.

Item 6. The method for producing a zirconia powder according to Item 5, wherein the temperature of the first step is 80° C. or more and 98° C. or less, and the temperature of the second step is 80° C. or more and 98° C. or less.

Advantageous Effects of Invention

The zirconia powder according to the present invention has a high molding density when molded, and can be obtained as a sintered product having a sintered density that is 99.5% or more of the theoretical sintered density. Therefore, the zirconia powder is suitable for various molding methods, such as press molding, injection molding, cast molding, and sheet molding. In addition, the zirconia powder according to the present invention can be easily mass-produced, and thus has excellent cost-competitiveness and can be used for various applications.

The method for producing a zirconia powder according to the present invention can produce the above zirconia powder in a simple manner, and is suitable as a method for producing the above zirconia powder.

DESCRIPTION OF EMBODIMENTS

Embodiments of the present invention are described in detail below. In the present specification, the terms "contain" and "comprise" include the concepts of "contain," "comprise," "substantially consist of," and "consist of."

Zirconia Powder

The zirconia powder of the present embodiment comprises 2 to 6 mol % of yttria, has a volume of pores with a pore diameter of 200 nm or less of 0.14 to 0.28 mL/g, and has a relative molding density of 44 to 55% when the zirconia powder is molded at a molding pressure of 1 t/cm$^2$, wherein the relative molding density is represented by the following formula (1):

$$\text{relative molding density (\%)} = (\text{molding density/theoretical sintered density}) \times 100 \qquad (1)$$

The above zirconia powder has a high molding density when molded, and can be obtained as a sintered product having a sintered density that is 99.5% or more of the theoretical sintered density. Moreover, due to its high molding density, the zirconia powder is suitable for various molding methods, such as press molding, injection molding, cast molding, and sheet molding.

In the present specification, the "powder" is formed containing primary particles as a minimum structural unit. All or some of the primary particles aggregate to form secondary particles. Therefore, the term "powder" as used in the present specification refers to a form containing secondary particle as a component. Because the secondary particles contain non-aggregated primary particles, the "powder" is technically formed containing primary particles and/or secondary particles as components.

Furthermore, in the present specification, the term "primary particle diameter" refers to the diameter of primary particles themselves, and the term "secondary particle diameter" refers to the diameter of secondary particles themselves.

Moreover, in the present specification, the phrase "the average particle diameter of the powder" refers to the average particle diameter of secondary particles contained in the powder, unless otherwise particularly specified.

The zirconia powder according to the present embodiment comprises zirconia as a main component. Specifically, the zirconia powder contains primary particles comprising zirconia as a main component. In particular, the zirconia powder may be mainly made of secondary particles formed by aggregation, of the primary particles comprising zirconia as a main component.

In addition to zirconia, which is a main component, the zirconia powder according to the present embodiment comprises 2 to 6 mol % of yttria based on the total molar amount of the powder. Yttria can form a solid solution together with zirconia. When the content ratio of yttria is 2 mol % or more, the ratio of the monoclinic phase in the sintered product of the zirconia powder can be prevented from exceeding. That is, the propagation of cracks can be prevented by large volume expansion caused by phase transition from the tetragonal phase to the monoclinic phase, thereby suppressing a reduction in the fracture toughness of the zirconia sintered product.

The content ratio of yttria based on the total molar amount of the powder is preferably 2 to 5 mol %, and particularly preferably 2 to 4 mol %. The content ratio of yttria is also preferably 3 to 6 mol % based on the total molar amount of the powder. When the content ratio of yttria is within this range, a cubic phase with low optical anisotropy is formed; thus, a zirconia sintered product having excellent translucency can be obtained.

The zirconia powder according to the present embodiment may contain aluminium oxide (alumina), if necessary.

The alumina content is not particularly limited, and is, for example, 0.005 to 2 mass % based on the total mass of the zirconia powder. When the zirconia powder contains alumina, the sinterability of the zirconia powder is improved, and the crystal structure can be easily homogenized. Moreover, because the zirconia powder contains alumina, a reduction in the fracture toughness of the zirconia sintered product can be easily suppressed. Furthermore, the translucency of the zirconia sintered product can be enhanced by adjusting the alumina content. The alumina content is preferably 0.01 to 1.5 mass %, and more preferably 0.03 to 1.2 mass %, based on the total mass of the zirconia powder.

The form of alumina is not particularly limited. An alumina powder is preferable in terms of ensuring handling properties during preparation of the zirconia powder, and reducing residual impurities.

When alumina is in the form of a powder, the average particle diameter of primary particles, of alumina is not particularly limited, and is, for example, 0.02 to 0.4 μm, preferably 0.05 to 0.3 μm, and even more preferably 0.07 to 0.2 μm.

The zirconia powder according to the present embodiment may contain other components as an alternative to part of yttria. Examples of other components include alkali earth metal oxides, such as calcia and magnesia; and rare earth oxides, such as ceria. This is because the characteristics, such as pore volume, of the zirconia powder are less likely to be affected by additive elements. The zirconia powder of the present embodiment essentially contains an yttria component; however, a powder that does not contain an yttria component may have the same action as the zirconia powder of the present embodiment.

In the zirconia powder according to the present embodiment, the volume of pores with a pore diameter of 200 nm or less is in the range of 0.14 to 0.28 mL/g. The term "pore diameter" as used herein refers to the size of gaps between secondary particles formed by aggregation of primary particles. The pore diameter can be measured by the mercury intrusion method using "AutoPore IV" (produced by Micromerieics). For example, the pore diameter can be determined by analysis software included with this device.

When the volume of pores of 200 nm or less is less than 0.14 mL/g, the aggregation of primary particles is overly strong; thus, secondary particles are coarsened, and sinterability is reduced. When the volume of pores of 200 nm or less exceeds 0.28 mL/g, the aggregation of primary particles is weak; thus, the molding density of the molded product is low, and a sintered product having a high sintered density cannot be obtained. The volume of pores of 200 nm or less is preferably 0.15 to 0.27 mL/g, and more preferably 0.16 to 0.27 mL/g. Since the volume of pores of greater than 200 nm indicates gaps between secondary particles, such large gaps are less relevant to the degree of aggregation of primary particles.

The pore volume mentioned above can be measured by the mercury intrusion method using a commercially available mercury porosimeter.

When the primary particle diameter of the zirconia powder of the present embodiment is 50 nm to 200 nm, gaps between the secondary particles formed by aggregation of the primary particles, i.e., the pore diameter between the primary particles, is likely to be 200 nm or less. The degree of aggregation of the primary particles, which constitute the secondary particles, can be controlled by controlling the volume of pores with a pore diameter of 200 nm or less. When the pore volume value is small, there are few gaps between the secondary particles, and the aggregation of the primary particles becomes strong. Accordingly, a molded product obtained from a powder with a low pore volume tends to have a high molding density, because primary particles that constitute secondary particles are densely packed in the molded product.

Because the zirconia powder according to the present embodiment has a pore volume within a specific range as described above, the degree of aggregation of primary particles that constitute secondary particles is increased, compared with conventionally known zirconia powders, and the coarsening of the primary particles can be suppressed. Therefore, the volume of pores with a pore diameter of 200 nm or less controlled within the above range is supposed to prevent the coarsening of the primary particles, while enhancing the aggregation of the primary particles themselves. The zirconia powder according to the present embodiment thereby has excellent characteristics, and particularly has excellent moldability.

The average particle diameter of the secondary particles contained in the zirconia powder according to the present embodiment (hereinafter simply referred to as the average particle diameter of the zirconia powder) is not particularly limited. For example, the average particle diameter of the zirconia powder can be 0.3 to 0.8 μm. When the average particle diameter of the zirconia powder is within the above range, a molded product having a high molding density can be easily obtained, and a reduction in sinterability and sintered density can be easily suppressed. Moreover, when the average particle diameter of the zirconia powder is within the above range, it is not necessary to lengthen the grinding time of the grinding process. When the average particle diameter of the zirconia powder is 0.8 µm or less, the ratio of the monoclinic phase in the powder is not overly high; thus, a sintered product having a high sintered density can be easily obtained. The average particle diameter of the zirconia powder is preferably 0.32 to 0.75 µm, and more preferably 0.35 to 0.75 µm.

The average particle diameter of the secondary particles contained in the zirconia powder can be measured by a commercially available laser diffraction particle size analyzer.

The specific surface area of the zirconia powder according to the present embodiment is not particularly limited. For example, the specific surface area of the zirconia powder can be 5 to 20 $m^2/g$. In this case, a molded product having a high molding density can be easily obtained, and a reduction in sinterability and sintered density can be easily suppressed. The specific surface area of the zirconia powder is preferably 6 to 18 $m^2/g$, and more preferably 6.5 to 15 $m^2/g$.

The specific surface area of the zirconia powder as used in the present specification refers to a BET specific surface area, and can be measured by the BET method using a commercially available specific surface area meter.

The zirconia powder according to the present embodiment has a relative molding density of 44 to 55% when molded at a molding pressure of 1 $t/cm^2$. The relative molding density used herein is a value determined by the following formula (1):

$$\text{relative molding density (\%)}=(\text{molding density/theoretical sintered density})\times 100 \quad (1).$$

The theoretical sintered density ($\rho_0$) used herein is a value determined by the following formula (2-1):

$$\rho_0=100/[(Y/3.987)+(100-Y)/\rho z] \quad (2\text{-}1)$$

wherein $\rho z$ is a value determined by the following formula (2-2):

$$\rho z=[124.25(100-X)+225.81X]/[150.5(100+X)A^2C] \quad (2\text{-}2)$$

wherein X and Y represent the yttria concentration (mole %) and the alumina concentration (wt. %), respectively. A and C are values determined by the following formulas (2-3) and (2-4), respectively:

$$A=0.5080+0.06980X/(100+X) \quad (2\text{-}3)$$

$$C=0.5195-0.06180X/(100+X) \quad (2\text{-}4)$$

In the formula (1), the theoretical sintered density varies depending on the composition of the powder. For example, the theoretical sintered density of yttria-containing zirconia is 6.112 $g/cm^3$ when the yttria content is 2 mol %, the theoretical sintered density is 6.092 $g/cm^3$ when the yttria content is 3 mol %, and the theoretical sintered density is 6.045 $g/cm^3$ when the yttria content is 5.5 mol %. In these theoretical sintered densities, 0.25% of alumina is taken into consideration. The molding density can be calculated by measuring the weight and volume of the molded product.

When the molded product of the zirconia powder is prepared by press molding, the molding pressure is generally about 0.1 t to 3 $t/cm^2$ in many cases.

In particular, when the zirconia powder according to the present embodiment is molded at a molding pressure of 1 $t/cm^2$, the relative molding density represented by the formula (1) above is 44 to 55%. When the volume of pores with a pore diameter of 200 nm or less mentioned above is outside the predetermined range, the relative sintered density does not reach 39.5% or more, even if the relative molding density represented by the formula (1) is 44% or more.

Because the relative molding density of the zirconia powder is 44 to 55%, it is easy to obtain a sintered product having a high sintered density. When the relative molding density of the zirconia powder is less than 44% or greater than 55%, the sintered density may be reduced.

In the zirconia powder of the present embodiment, the sintered density when sintering is performed at 1450° C. can be 99.5% or more of the theoretical sintered density. In other words, in the zirconia powder of the present embodiment, the relative sintered density when sintering is performed at 1450° C. can be 99.5% or more.

When the relative sintered density of the sintered product of the zirconia powder is within the above range, the sintered product particularly has excellent performance. The relative sintered density is more preferably 99.6% or more. The sintered product can toe produced by sintering the molded product of the zirconia powder of the present embodiment.

The above relative sintered density more specifically refers to a relative sintered density represented by the following formula (3):

$$\text{relative sintered density (\%)}=(\text{sintered density/theoretical sintered density})\times 100 \quad (3)$$

The theoretical sintered density in the formula (3) is the same as the theoretical sintered density represented by the formula (1) above. For example, the theoretical sintered density of yttria-containing zirconia is 6.112 $g/cm^3$ when the yttria content is 2 mol %, the theoretical sintered density is 6.092 $g/cm^3$ when the yttria content is 3 mol %, and the theoretical sintered density is 6.045 $g/cm^3$ when the yttria content is 5.5 mol %. In these theoretical sintered densities, 0.25% of alumina is taken into consideration. The sintered density can be measured by the Archimedes method.

Because the volume of pores with a pore diameter of 200 nm or less is within a specific range, the zirconia powder according to the present embodiment has a high molding density when molded, and can be easily formed into a sintered product having a sintered density that is 99.5% or more of the theoretical sintered density.

The high molding density and excellent sinterability of the zirconia powder according to the present embodiment are attributable to the volume of pores with a pore diameter of 200 nm or less within a specific range, which can increase the aggregation of the primary particles constituting the zirconia powder, and which can prevent the coarsening of the primary particles.

It was conventionally possible to specify the secondary particle diameter by laser diffractometry or the like, and to specify the primary particle diameter by SEM observation and specific surface area measurement by the BET method. Accordingly, the molding density was controlled by using them as indicators. However, since the aggregation of primary particles was not controlled, which was not reported before, powders having the same average particle diameter of secondary particles had different molding densities in some cases, and powders having the same specific surface area had different molding densities in some cases. For this reason, a high molding density was not always obtained even by controlling the average particle diameter and the specific surface area within specific ranges.

On the other hand, when a powder with a larger primary particle diameter is used so as to increase the molding density, as is conventionally done, the sinterability is reduced, thereby failing to obtain a sintered product having a high sintered density (a relative density of 99.5% or more). Conversely, when the size of primary particles is reduced, friction between the particles increases, thereby failing to obtain a molded product having a high molding density. In order to achieve a high molding density, it is possible to add a binder to reduce the friction between the particles; however, the effect of adding a binder is limited. Further, because it is necessary to burn away the binder at a low temperature before sintering, cracks or air holes may be generated in the sintered product due to the presence of the binder; it is thus necessary to reduce, as much as possible, the amount of binder added.

In contrast, the zirconia powder according to the present embodiment enables control of the degree of aggregation of primary particles constituting secondary particles, which has not been conventionally controlled, whereby a molded product having a high molding density can be obtained, and its sintered product also has a high sintered density. In addition, according to the zirconia powder of the present embodiment, a molded product having a high molding density can be obtained without adding a binder to the zirconia powder, and the amount of the binder can be reduced.

As described above, according to the zirconia powder of the present embodiment, a molded product having a high molding density can be obtained, and a sintered product having a high sintered density can be obtained; therefore, various known molding methods, such as press molding, injection molding, cast molding, and sheet molding, can be widely used. In addition, the zirconia powder according to the present invention can be easily mass-produced, and thus has high cost-competitiveness and can be suitably used for various applications.

Method for Producing Zirconia Powder

The method for producing the above zirconia powder comprises:

a first step of warming a sulfidizing agent solution at a temperature of 75° C. or more and less than 100° C., and maintaining the sulfidizing agent solution at this temperature;

a second step of warning a zirconium salt solution at a temperature of 75° C. or more and less than 100° C., and maintaining the zirconium salt solution at this temperature;

a third step of mixing the sulfidizing agent solution maintained in the first step and the zirconium salt solution maintained in the second step to thereby prepare a reactant; and a fourth step of treating the reactant prepared in the third step with a base, followed by heating in an atmosphere at a temperature of 1000° C. or more and less than 1200° C. Each step is described in detail below.

In the first step, a sulfidizing agent solution is warmed at a temperature of 75° C. or more and less than 100° C., and is maintained at this temperature.

The sulfidizing agent solution can be prepared by mixing a sulfidizing agent and a solvent. The sulfidizing agent contains a compound that reacts with zirconium ions to produce sulfate. That is, the sulfidizing agent contains a compound that can react with zirconium ions to produce sulfate.

Examples of the sulfidizing agent include sodium sulfate, ammonium sulfate, and the like. Sodium sulfate is preferred in terms of waste water etc. The purity of the sulfidizing agent is preferably 95% or more, and more preferably 98% or more.

The sulfidizing agent may have any form, such as powder, solution, or the like.

The solvent in the sulfidizing agent solution is not particularly limited, as long as it can dissolve the sulfidizing agent. Examples include organic solvents, such as aqueous solvents (e.g., water) and alcohols (e.g., methanol and ethanol). These solvents can be used singly or in combination of two or more. The solvent is preferably water.

The concentration of the sulfidizing agent solution can be 5 to 25 wt %. The concentration of the compound that reacts with zirconium ions to produce sulfate can be 5 to 25 wt %.

The above sulfidizing agent solution is warmed at a temperature of 75° C. or more and less than 100° C. in the first step.

In the first step, the sulfidizing agent solution is preferably warmed at a temperature of 80° C. or more and 98° C. or less, and particularly preferably 85° C. or more and 95° C. or less. The upper limit of warming is particularly preferably a temperature equal to or less than the boiling point of the solvent.

The sulfidizing agent solution can be warmed by using a commercially available heating device, such as a hot plate. There is no upper limit on the heating temperature, but a temperature equal to or less than the boiling point of the solvent is preferable.

The warmed sulfidizing agent solution is maintained at that temperature. The maintaining method is not particularly limited. The warming state may be maintained by keeping the warming temperature by a heating device at a constant temperature, or may be maintained by a thermostat at a constant temperature. Moreover, the sulfidizing agent solution may be in a stationary state or in a state where stirring or shaking is continued, during maintenance of the warming state.

When the warming state is maintained, in order to maintain the concentration of the sulfidizing agent solution, it is preferable to cover the container of the sulfidizing agent solution to thereby prevent the evaporation of the solvent.

In the second step, a zirconium salt solution is warmed at a temperature of 75° C. or more and less than 100° C., and is maintained at this temperature. The zirconium salt solution can be prepared by mixing a zirconium salt and a solvent.

Zirconium salts are not particularly limited, as long as they are compounds that can supply zirconium ions. Examples of zirconium salts include zirconium inorganic acid salts, such as zirconium oxynitrate and zirconium oxychloride; zirconium organic acid salts, such as zirconium tetrabutoxide; and the like. These zirconium salts can be used singly or in combination of two or more.

The solvent in the zirconium salt solution is not particularly limited, as long as it can dissolve a zirconium salt raw material. Examples include aqueous solvents, such as water; and organic solvents, such as methanol and ethanol. These solvents can be used singly or in combination of two or more.

Specific examples of the combination of a zirconium salt (raw material) and a solvent are shown below. When the solvent is an aqueous solvent, such as water, the zirconium salt can be a zirconium inorganic acid salt, such as zirconium oxynitrate or zirconium oxychloride. Moreover, when the solvent is an organic solvent, such as methanol or ethanol, the zirconium salt can be a zirconium organic acid salt, such as zirconium tetrabutoxide.

In the production method of the present embodiment, it is preferable to use zirconium oxychloride in an aqueous solvent (particularly water), in terms of industrial-scale productivity etc.

The zirconium salt may have any form, such as powder, solution, or the like.

The concentration of the zirconium salt solution is not particularly limited, and may be suitably determined depending on the type, solubility, etc., of the zirconium salt used. Regarding the concentration of the zirconium salt solution, for example, it is preferable that a zirconium salt is contained in an amount of about 5 to 200 g, in terms of zirconia, in 1000 g of the solvent; and it is more preferable that a zirconium raw material is contained in an amount of 10 to 100 g, in terms of zirconia. The purity of the zirconium salt is preferably 95% or more, and more preferably 98% or more.

The above zirconium salt solution is warmed at a temperature of 75° C. or more and less than 100° C. in the second step.

In the second step, the zirconium salt solution is preferably warmed at a temperature of 80° C. or more and 98° C. or less, and particularly preferably 85° C. or more and 95° C. or less. The upper limit of warming is particularly preferably a temperature equal to or less than the boiling point of the solvent.

The zirconium salt solution can be warmed by using a commercially available heating device, such as a hot plate. There is no upper limit on the heating temperature, but a temperature equal to or less than the boiling point of the solvent is preferable.

The warmed zirconium salt solution is maintained at that temperature. The maintaining method is not particularly limited. The warming state may be maintained by keeping the warming temperature by a heating device at a constant temperature, or may be maintained by a thermostat at a constant temperature. Moreover, the zirconium salt solution may be in a stationary state or in a state where stirring or shaking is continued, during maintenance of the warming state.

When the warming state is maintained, in order to maintain the concentration of the zirconium salt solution, it is preferable to cover the container of the zirconium salt solution to thereby prevent the evaporation of the solvent.

In the third step, the sulfidizing agent solution warmed and maintained at the constant temperature in the first step, and the zirconium salt solution warmed and maintained at the constant temperature in the second step are mixed to prepare a reactant.

As a result of the above mixing process, the sulfidizing agent and the zirconium salt solution are reacted to thereby obtain a reaction solution. The obtained reaction solution contains basic zirconium sulfate as a product.

The temperature at which the reaction solution is obtained by the above mixing process, i.e., the reaction temperature, is preferably 75° C. or more and less than 100° C. When the reaction temperature is within this range, it is easy to control the degree of aggregation of basic zirconium sulfate and the particle diameter thereof in the slurry to be produced, and it is easy to control the degree of aggregation of the hydroxide to be obtained later and the particle diameter thereof. Moreover, because the reaction temperature is higher than 75° C., the hydroxide can be easily prevented from growing to a large size to overly increase the particle diameter of the oxide after firing. Furthermore, because the particle diameter of the powder to be obtained tends to be 0.3 µm or less, it is less necessary to use a grinding process, and it is possible to have high sinterability. The reaction temperature is preferably 80° C. or more and 98° C. or less, and more preferably 85° C. or more and 95° C. or less. The reaction temperature can be the same as the warming temperature in the first step or the second step.

When a reaction solution is obtained by the above mixing process, the sulfidizing agent solution may be mixed into the zirconium salt solution, and vice versa.

The mixing ratio of the zirconium salt solution and the sulfidizing agent solution is not particularly limited. For example, the weight ratio of sulfidizing agent to zirconia is 0.3 to 0.8, and preferably 0.4 to 0.7. When these solutions are mixed, the total amount of the zirconium salt solution and the total amount of the sulfidizing agent solution can be mixed.

When the zirconium salt solution and the sulfidizing agent solution are mixed to prepare a reactant, mixing is preferably performed in a relatively short time. Specifically, mixing is performed in 3 seconds to 100 seconds, preferably 5 seconds to 80 seconds, and more preferably 5 seconds to 30 seconds. Moreover, mixing is preferably performed while stirring.

A reactant is produced in the mixed solution prepared by the above mixing process. The reactant comprises basic zirconium sulfate as a main component. That is, the mixed solution prepared by the above mixing process is a basic zirconium sulfate slurry.

In the fourth step, the reactant prepared in the third step is treated with a base, and then heated in an atmosphere at a temperature of 1000° C. or more and less than 1200° C. That is, in the fourth step, the solid content obtained by treating, with a base, the basic zirconium sulfate (reactant) produced in the third step is heated in an atmosphere at a temperature of 1000° C. or more and less than 1200° C.

Before the reactant is treated with a base, if necessary, solid-liquid separation may be performed to obtain basic zirconium sulfate, and the basic zirconium sulfate may be washed with water. Solid-liquid separation can be performed by a known method, such as filtration, centrifugal separation, or decantation. The basic zirconium sulfate after water-washing can be re-dispersed in a dispersion medium, such as water, to thereby obtain a basic zirconium sulfate slurry.

The reactant prepared in the third step is treated with a base to thereby obtain a zirconium hydroxide slurry. That is, a zirconium hydroxide slurry is obtained as a precipitate by the base treatment of the basic zirconium sulfate slurry.

The base is not particularly limited, and examples include ammonium hydroxide, ammonium bicarbonate, sodium hydroxide, potassium hydroxide, and the like. These bases can be used singly or in combination of two or more.

The amount of the base added is not particularly limited. For example, the base can be added in an amount that allows generation of a precipitate from the basic zirconium sulfate slurry. In general, the base can be added so that the pH of the basic zirconium sulfate slurry is 10 or more, and preferably 12 or more.

After the base is added, if necessary, solid-liquid separation may be performed, and the obtained zirconium hydroxide may be washed with water. Solid-liquid separation may be performed by the method described above. The zirconium hydroxide after water-washing can be re-dispersed in a dispersion medium, such as water, to thereby obtain a zirconium hydroxide slurry.

The zirconium hydroxide may be further dried, if necessary. Drying may be performed by a known method, such as natural drying or heating drying.

The zirconium hydroxide is heated in an atmosphere at a temperature (firing temperature) of 1000° C. or more and less than 1200° C. As a result of the heat treatment, the zirconium hydroxide is fired to form zirconia. If necessary, a grinding treatment, classifying processing, etc., may then be conducted. Because the firing temperature is within the above range, a zirconia powder having the desired pore diameter and pore volume can be obtained.

The above heat treatment, temperature (i.e., firing temperature) is preferably 1040 to 1180° C. The heat treatment atmosphere can be atmospheric air or an oxidizing atmosphere.

The grinding method is not particularly limited. For example, grinding can be performed by using a commercially available grinder, such as a planetary mill, a ball mill, or a jet mill.

An yttrium raw material can be suitably mixed in any of the first step to the third step. Moreover, yttrium may be mixed, not only in any of the first step to the third step, but also in a subsequent step. The yttrium raw material can be mixed in a suitable step depending on the type of yttrium raw material. For example, the yttrium raw material can be added to the zirconium hydroxide slurry obtained in the third step.

Examples of the yttrium raw material include yttrium nitrate, yttrium chloride, and the like. Other examples of the yttrium raw material include yttrium sol, yttria powder, and the like. The yttrium raw material may be an oxide, but is preferably water-soluble because it can be highly dispersed in zirconia. In this case, examples include yttrium nitrate, yttrium sulfate, yttrium acetate, yttrium chloride, yttrium bromide, and the like; however, in terms of reducing residual impurities, the raw material salt is preferably yttrium chloride. The purity of the yttrium raw material is preferably 95% or more, and more preferably 98% or more.

The amount of the yttrium raw material used can be adjusted so that the content ratio of yttria is 2 to 6 mol % in the zirconia powder to be obtained.

A specific amount of yttrium can be highly dispersed in zirconia by adding the yttrium raw material in any of the steps as described above.

When the zirconia powder is produced, a raw material containing aluminum can be added. In this case, the zirconia powder to be obtained can contain alumina.

Examples of the raw material containing aluminum include at least one of aluminium nitrate, aluminium chloride, and the like. Other examples of the raw material containing aluminum include alumina sol, alumina powder, and the like. The purity of the raw material containing aluminum is preferably 95% or more, and more preferably 98% or more. The raw material containing aluminum is preferably an alumina powder, in terms of ensuring handling properties and reducing residual impurities. When an alumina powder is added as the raw material containing aluminum, the average particle diameter of primary particles of the powder is not particularly limited, but is, for example, 0.02 to 0.4 μm, preferably 0.05 to 0.3 μm, and more preferably 0.07 to 0.2 μm.

The raw material containing aluminum can be suitably added in any of the first step to the third step. Moreover, the raw material containing aluminum may be mixed, not only in any of the first step to the third step, but also in a subsequent step. The raw material containing aluminum may be mixed in a suitable step depending on the type of raw material containing aluminum. For example, alumina can be added to the zirconium hydroxide slurry, or can be added to a fired product obtained by firing the dried zirconium hydroxide slurry.

The amount of the raw material containing aluminum used may be adjusted so that the content ratio of alumina is a desired content in the zirconia powder to be obtained.

When the zirconia powder is produced, raw materials containing alkaline earth elements and rare earth elements (except for yttrium and promethium) may be added. In this case, the zirconia powder to be obtained can contain oxides of these materials.

Examples of alkaline earth elements include Ca, Mg, Sr, and Ba.

Examples of rare earth elements include at least one of Sc, La, Nd, Pr, Sm, Eu, Gd, Tb, Dy, Ho, Er, Tm, and Lu.

The raw material containing an alkaline earth element, and the raw material containing a rare earth element may be oxides, but are preferably water-soluble. Examples include nitrate, sulfate, acetate, chloride, bromide, and the like. Of these, the raw material salt is preferably chloride or nitrate, in terms of reducing residual impurities. The purity of these raw materials is preferably 95% or more, and more preferably 98% or more. These raw materials can be suitably added in any of the first step to the third step. Moreover, the raw material containing aluminum may be mixed, not only in any of the first step to the third step, but also in a subsequent step. The raw material containing aluminum may be mixed in a suitable step depending on the type of raw material containing aluminum.

As explained above, the zirconia powder of the present embodiment can be produced through at least the first step, the second step, the third step, and the fourth step.

In the production method of the present embodiment, the zirconia powder obtained as described above may be ground into a slurry, if necessary. In this case, a binder can be added in order to enhance moldability. When a slurry is not formed, a binder and the zirconia powder can be uniformly mixed by a kneader.

The above binder is preferably an organic binder. An organic binder can be easily removed from the molded product in a heating furnace in an oxidizing atmosphere, and a degreased product can be obtained; finally, impurities are less likely to remain in the sintered product.

Examples of organic binders include those that are soluble in alcohols, or mixed solutions of two or more members selected from the group consisting of alcohols, water, aliphatic ketones, and aromatic hydrocarbons. Examples include at least one or more members selected from the group consisting of polyethylene glycol, glycol fatty acid ester, glycerol fatty acid ester, polyvinyl butyral, polyvinyl methyl ether, polyvinyl ethyl ether, and vinyl propionate. The organic binder may further contain one or more thermoplastic resins that are insoluble in alcohols, or the mixed solutions mentioned above.

After this organic binder is added, drying, grinding, and like processing are performed by applying known methods, thereby obtaining the target zirconia powder.

When the above zirconia powder is produced, the temperature of the first step is preferably 80° C. or more and 98° C. or less, and the temperature of the second step is preferably 80° C. or more and 98° C. or less. That is, it is preferable that the warming temperature be 80° C. or more and 98° C. or less in both the first step and the second step.

When the zirconia powder is molded, a commercially available metal molding machine, cold isostatic pressing (CIP) treatment, etc., can be used. Moreover, the zirconia powder may be pre-molded by a metal molding machine, and then molded by press molding. Press molding is generally performed at 0.1 t to 3 t/cm$^2$ in many cases; however, the zirconia powder of the present embodiment can be molded at 1 t/cm$^2$.

A green compact obtained by molding the zirconia powder is sintered to thereby produce a sintered product. The sintering temperature is not limited, and is, for example, 1300 to 1500° C. The maintaining time during sintering is also not particularly limited, and is, for example, about 1 to 5 hours. The sintering atmosphere can be atmospheric air or an oxidizing atmosphere.

In the zirconia powder produced in the above manner, the volume of pores with a pore diameter of 200 nm or less is 0.14 to 0.28 mL/g, and the relative molding density (%) when the powder is molded at a molding pressure of 1 t/cm$^2$ is 44 to 55%.

The pore diameter and pore volume can be controlled by, for example, adjusting the temperature at which the sulfidizing agent solution is maintained in the first step. Moreover, the pore diameter and pore volume can be controlled by, for example, adjusting the temperature at which the zirconium salt solution is maintained in the second step. By adjusting these temperatures, the degree of aggregation of basic zirconium sulfate produced in the third step varies; thus, the pore diameter and pore volume of the zirconia powder to be ultimately obtained vary. That is, the pore diameter and pore volume of the zirconia powder of the present embodiment can be controlled by adjusting the degree of aggregation of basic zirconium sulfate. Alternatively, the pore diameter and pore volume can also be controlled by adjusting the above firing temperature in the production of the zirconia powder.

The method for producing the zirconia powder described above can produce the above zirconia powder in a simple manner, and is suitable as a method for producing the above zirconia powder.

EXAMPLES

The present invention is described in more detail below with reference to Examples; however, the present invention is not limited to the embodiments of these Examples. The zirconia powders obtained in the Examples and Comparative Examples contain 1.3 to 2.5% of hafnium oxide as an inevitable imparity.

The method for measuring each physical property is as follows.

(1) Specific Surface Area

The specific surface area was measured by the BET method using a specific surface area analyzer "FlowSorb II" (produced by Micromeritics).

(2) Pore Volume and Pore Diameter

The pore volume and pore diameter were measured by the mercury intrusion method using a measuring apparatus "AutoPore IV" (produced by Micromeritics).

(3) Composition Analysis

The composition was analyzed using ICP-AES "ULTIMA-2" (produced by HORIBA).

(4) Average Particle Diameter

The average particle, diameter was measured using, a laser diffraction particle size analyzer "SALB-2300" (produced by Shimadzu Corporation).

Example 1

A sodium sulfate powder was dissolved in ion exchange water to obtain a 5 wt % solution of sodium sulfate. The obtained sodium sulfate solution was warmed and maintained at 85° C.

Meanwhile, a zirconium oxychloride salt solution was prepared so that 1 wt % of zirconium, in terms of zirconia, was contained. The zirconium salt solution was warmed and maintained at 85° C. The total amount of zirconia was 100 g.

Next, a total amount of 1000 g of the sodium sulfate solution maintained at a constant temperature of 85° C. was added, while stirring, in 10 seconds to the zirconium salt solution maintained at a constant temperature of 85° C., and mixed, thereby obtaining a basic zirconium sulfate slurry. An yttrium chloride solution was added to the slurry so that the amount of yttria was 3.0 mol % relative to zirconia. Then, neutralization was performed using sodium hydroxide to obtain a hydroxide.

The hydroxide was filtered off and washed with water, and then fired in an electric furnace at a firing temperature of 1000° C., thereby obtaining an oxide. Thereafter, 0.25 wt % of alumina powder having an average particle diameter of 0.1 μm was added to the oxide, and the mixture was ground and mixed for 30 hours by a wet ball mill using water as a dispersion medium. The obtained slurry was dried at a constant temperature of 120° C., thereby obtaining the target zirconia powder.

The obtained zirconia powder (8 g) was pre-molded in a metal mold having a diameter of 25 mm, and molded at a molding pressure (hydrostatic pressure) of 1 t/cm$^2$. The molding density of the molded product was determined by measuring the weight and volume. The obtained molded product was sintered at 1450° C. for 2 hours to obtain a sintered product. The sintered density of the obtained sintered product was measured by the Archimedes method.

Example 2

A zirconia powder was prepared in the same manner as in Example 1, except that the firing temperature was changed to 1050° C. Then, a sintered product of the zirconia powder was obtained.

Example 3

A zirconia powder was prepared in the same manner as in Example 1, except that the firing temperature was changed to 1075° C. Then, a sintered product of the zirconia powder was obtained.

Example 4

A zirconia powder was prepared in the same manner as in Example 1, except that the firing temperature was changed to 1100° C. Then, a sintered product of the zirconia powder was obtained.

Comparative Example 1

A zirconia powder was prepared in the same manner as in Example 1, except that the firing temperature was changed to 900° C. Then, a sintered product of the zirconia powder was obtained.

Comparative Example 2

A zirconia powder was prepared in the same manner as in Example 1, except that the firing temperature was changed to 1200° C. Then, a sintered product of the zirconia powder was obtained.

Example 5

A zirconia powder was prepared in the same manner as in Example 1, except that the sodium sulfate solution and the zirconium salt solution were maintained at 90° C., the sodium sulfate solution and the zirconium salt solution were mixed at 90° C., and the firing temperature was changed to 1040° C. Then, a sintered product of the zirconia powder was obtained.

Example 6

A zirconia powder was prepared in the same manner as in Example 5, except that the firing temperature was changed to 1100° C. Then, a sintered product of the zirconia powder was obtained.

Example 7

A zirconia powder was prepared in the same manner as in Example 5, except that the firing temperature was changed to 1140° C. Then, a sintered product of the zirconia powder was obtained.

Example 8

A zirconia powder was prepared in the same manner as in Example 5, except that the yttrium chloride solution was added so that the amount of yttria was 2.0 mol % relative to zirconia, and the firing temperature was changed to 1100° C. Then, a sintered product of the zirconia powder was obtained.

Comparative Example 3

A zirconia powder was prepared in the same manner as in Example 5, except that the firing temperature was changed to 900° C. Then, a sintered product of the zirconia powder was obtained.

Comparative Example 4

A zirconia powder was prepared in the same manner as in Example 5, except that the firing temperature was changed to 1200° C. Then, a sintered product of the zirconia powder was obtained.

Example 9

A zirconia powder was prepared in the same manner as in Example 1, except that the sodium sulfate solution and the zirconium salt solution were maintained at 95° C., the sodium sulfate solution and the zirconium salt solution were mixed at 95° C., and the firing temperature was changed to 1100° C. Then, a sintered product of the zirconia powder was obtained.

Example 10

A zirconia powder was prepared in the same manner as in Example 9, except that the firing temperature was changed to 1140° C. Then, a sintered product of the zirconia powder was obtained.

Example 11

A zirconia powder was prepared in the same manner as in Example 10, except that the yttrium chloride solution was added so that the amount of yttria was 2.0 mol % relative to zirconia. Then, a sintered product of the zirconia powder was obtained.

Example 12

A zirconia powder was prepared in the same manner as in Example 9, except that the yttrium chloride solution was added so that the amount of yttria was 5.5 mol % relative to zirconia, and the firing temperature was changed to 1180° C. Then, a sintered product of the zirconia powder was obtained.

Comparative Example 5

A zirconia powder was prepared in the same manner as in Example 9, except that the firing temperature was changed to 980° C. Then, a sintered product of the zirconia powder was obtained.

Comparative Example 6

A zirconia powder was prepared in the same manner as in Example 9, except that the firing temperature was changed to 1200° C. Then, a sintered product of the zirconia powder was obtained.

Comparative Example 7

A zirconia powder was prepared in the same manner as in Example 1, except that the sodium sulfate solution and the zirconium salt solution were maintained at 60° C., the sodium sulfate solution and the zirconium salt solution were mixed at 60° C., and the firing temperature was changed to 1100° C. Then, a sintered product of the zirconia powder was obtained.

In the above Examples and Comparative Examples, the relative sintered density was determined from the sintered density obtained under conditions where the sintered products were maintained at 1450° C. for 2 hours.

The theoretical sintered density was 6.112 g/cm$^3$ for 2 mol % of yttria, 6.092 g/cm$^3$ for 3 mol % of yttria, and 6.045 g/cm$^3$ for 5.5 mol % of yttria.

Table 1 shows the main production conditions, pore volume, specific surface area, average particle diameter (written as "particle diameter"), relative molding density, and relative sintered density in each Example and Comparative Example. The relative molding density and the relative sintered density can be calculated from the formulas (1) and (3) described above.

TABLE 1

| No. | Reaction solution temperature (° C.) | $Y_2O_3$ (mol) | Firing temperature (° C.) | Pore volume (mL/g) | Specific surface area (m$^2$/g) | Particle diameter (μm) | Relative molding density (%) | Relative sintered density (%) | Notes |
|---|---|---|---|---|---|---|---|---|---|
| No. 1 | 85 | 3.0 | 900 | 0.29 | 28.1 | 0.86 | 45.6 | 98.9 | Comparative Example 1 |
| No. 2 | 85 | 3.0 | 1000 | 0.24 | 14.7 | 0.78 | 48.6 | 99.6 | Example 1 |
| No. 3 | 85 | 3.0 | 1050 | 0.20 | 11.5 | 0.71 | 50.1 | 99.7 | Example 2 |
| No. 4 | 85 | 3.0 | 1075 | 0.18 | 8.7 | 0.76 | 51.7 | 99.5 | Example 3 |

TABLE 1-continued

| No. | Reaction solution temperature (° C.) | Y$_2$O$_3$ (mol) | Firing temperature (° C.) | Pore volume (mL/g) | Specific surface area (m$^2$/g) | Particle diameter (μm) | Relative molding density (%) | Relative sintered density (%) | Notes |
|---|---|---|---|---|---|---|---|---|---|
| No. 5 | 85 | 3.0 | 1100 | 0.16 | 6.6 | 0.70 | 54.0 | 99.6 | Example 4 |
| No. 6 | 85 | 3.0 | 1200 | 0.13 | 6.2 | 0.69 | 55.2 | 99.2 | Comparative Example 2 |
| No. 7 | 90 | 3.0 | 900 | 0.35 | 25.3 | 0.55 | 41.1 | 99.3 | Comparative Example 3 |
| No. 8 | 90 | 3.0 | 1040 | 0.27 | 13.4 | 0.49 | 44.7 | 99.8 | Example 5 |
| No. 9 | 90 | 3.0 | 1100 | 0.25 | 11.0 | 0.52 | 45.2 | 99.9 | Example 6 |
| No. 10 | 90 | 3.0 | 1140 | 0.21 | 7.8 | 0.51 | 46.5 | 99.8 | Example 7 |
| No. 11 | 90 | 2.0 | 1100 | 0.23 | 9.0 | 0.54 | 45.8 | 99.9 | Example 8 |
| No. 12 | 90 | 3.0 | 1200 | 0.11 | 6.0 | 0.52 | 47.8 | 99.2 | Comparative Example 4 |
| No. 13 | 95 | 3.0 | 980 | 0.33 | 18.8 | 0.39 | 44.0 | 99.4 | Comparative Example 5 |
| No. 14 | 95 | 3.0 | 1100 | 0.26 | 10.8 | 0.36 | 46.7 | 99.8 | Example 9 |
| No. 15 | 95 | 3.0 | 1140 | 0.23 | 9.1 | 0.37 | 47.3 | 99.8 | Example 10 |
| No. 16 | 95 | 2.0 | 1140 | 0.19 | 8.9 | 0.36 | 48.4 | 99.8 | Example 11 |
| No. 17 | 95 | 5.5 | 1180 | 0.20 | 8.9 | 0.38 | 48.9 | 99.8 | Example 12 |
| No. 18 | 95 | 3.0 | 1200 | 0.12 | 5.7 | 0.43 | 50.4 | 99.3 | Comparative Example 6 |
| No. 19 | 60 | 3.0 | 1100 | 0.11 | 8.1 | 0.86 | 48.3 | 98.7 | Comparative Example 7 |

The invention claimed is:

1. A zirconia powder comprising 2 to 6 mol % of yttria, having a volume of pores with a pore diameter of 200 nm or less of 0.14 to 0.28 mL/g, and having a relative molding density of 44 to 55% when the zirconia powder is molded at a hydrostatic pressure of 1 t/cm$^2$, wherein the relative molding density is represented by the following formula (1):

$$\text{relative molding density (\%)} = (\text{molding density/theoretical sintered density}) \times 100 \quad (1).$$

2. The zirconia powder according to claim 1, wherein the zirconia powder has a specific surface area of 5 to 20 m$^2$/g, and an average particle diameter of 0.3 to 0.8 μm.

3. The zirconia powder according to claim 1, further comprising aluminium oxide.

4. The zirconia powder according to claim 1, wherein the sintered density when a molded product obtained by molding at a hydrostatic pressure of 1 t/cm$^2$ is sintered at 1450° C. is 99.5% or more of the theoretical sintered density.

5. A method for producing a zirconia powder according to claim 1, the method comprising:
a first step of warming a sulfidizing agent solution at a temperature of 75° C. or more and less than 100° C., and maintaining the sulfidizing agent solution at this temperature;
a second step of warming a zirconium salt solution at a temperature of 75° C. or more and less than 100° C., and maintaining the zirconium salt solution at this temperature;
a third step of mixing the sulfidizing agent solution maintained in the first step and the zirconium salt solution maintained in the second step to thereby prepare a reactant; and
a fourth step of treating the reactant prepared in the third step with a base, followed by heating in an atmosphere at a temperature of 1000° C. or more and less than 1200° C.

6. The method for producing a zirconia powder according to claim 5, wherein the temperature of the first step is 80° C. or more and 98° C. or less, and the temperature of the second step is 80° C. or more and 98° C. or less.

7. The zirconia powder according to claim 2, further comprising aluminium oxide.

8. The zirconia powder according to claim 2, wherein the sintered density when a molded product obtained by molding at a hydrostatic pressure of 1 t/cm$^2$ is sintered at 1450° C. is 99.5% or more of the theoretical sintered density.

9. The zirconia powder according to claim 3, wherein the sintered density when a molded product obtained by molding at a hydrostatic pressure of 1 t/cm$^2$ is sintered at 1450° C. is 99.5% or more of the theoretical sintered density.

10. A method for producing a zirconia powder according to claim 2, the method comprising:
a first step of warming a sulfidizing agent solution at a temperature of 75° C. or more and less than 100° C., and maintaining the sulfidizing agent solution at this temperature;
a second step of warming a zirconium salt solution at a temperature of 75° C. or more and less than 100° C., and maintaining the zirconium salt solution at this temperature;
a third step of mixing the sulfidizing agent solution maintained in the first step and the zirconium salt solution maintained in the second step to thereby prepare a reactant; and
a fourth step of treating the reactant prepared in the third step with a base, followed by heating in an atmosphere at a temperature of 1000° C. or more and less than 1200° C.

11. A method for producing a zirconia powder according to claim 3, the method comprising:
a first step of warming a sulfidizing agent solution at a temperature of 75° C. or more and less than 100° C., and maintaining the sulfidizing agent solution at this temperature;
a second step of warming a zirconium salt solution at a temperature of 75° C. or more and less than 100° C., and maintaining the zirconium salt solution at this temperature;
a third step of mixing the sulfidizing agent solution maintained in the first step and the zirconium salt solution maintained in the second step to thereby prepare a reactant; and a fourth step of treating the reactant prepared in the third step with a base, followed by heating in an atmosphere at a temperature of 1000° C. or more and less than 1200° C.

12. A method for producing a zirconia powder according to claim 4, the method comprising:
a first step of warming a sulfidizing agent solution at a temperature of 75° C. or more and less than 100° C., and maintaining the sulfidizing agent solution at this temperature;
a second step of warming a zirconium salt solution at a temperature of 75° C. or more and less than 100° C., and maintaining the zirconium salt solution at this temperature;
a third step of mixing the sulfidizing agent solution maintained in the first step and the zirconium salt solution maintained in the second step to thereby prepare a reactant; and
a fourth step of treating the reactant prepared in the third step with a base, followed by heating in an atmosphere at a temperature of 1000° C. or more and less than 1200° C.

13. The method for producing a zirconia powder according to claim 10, wherein the temperature of the first step is 80° C. or more and 98° C. or less, and the temperature of the second step is 80° C. or more and 98° C. or less.

14. The method for producing a zirconia powder according to claim 11, wherein the temperature of the first step is 80° C. or more and 98° C. or less, and the temperature of the second step is 80° C. or more and 98° C. or less.

15. The method for producing a zirconia powder according to claim 12, wherein the temperature of the first step is 80° C. or more and 98° C. or less, and the temperature of the second step is 80° C. or more and 98° C. or less.

* * * * *